US012577817B2

(12) United States Patent
Cunningham et al.

(10) Patent No.: US 12,577,817 B2
(45) Date of Patent: Mar. 17, 2026

(54) VEHICLE INSIDE DOOR LEVER ASSEMBLY

(71) Applicant: Toyota Motor Engineering & Manufacturing North America, Inc., Plano, TX (US)

(72) Inventors: James D. Cunningham, Clarkston, MI (US); Justin B. Norris, Brighton, MI (US)

(73) Assignees: Toyota Motor Engineering & Manufacturing North America, Inc., Plano, TX (US); Toyota Jidosha Kabushiki Kaisha, Toyota (JP)

(*) Notice: Subject to any disclaimer, the term of this patent is extended or adjusted under 35 U.S.C. 154(b) by 66 days.

(21) Appl. No.: 18/422,632

(22) Filed: Jan. 25, 2024

(65) Prior Publication Data

US 2025/0243697 A1 Jul. 31, 2025

(51) Int. Cl.
*E05B 85/12* (2014.01)
*E05B 85/16* (2014.01)

(52) U.S. Cl.
CPC .............. *E05B 85/16* (2013.01); *E05B 85/12* (2013.01)

(58) Field of Classification Search
CPC .......... E05B 85/10; E05B 85/12; E05B 85/13; E05B 85/14; E05B 85/16; E05B 85/18
See application file for complete search history.

(56) References Cited

U.S. PATENT DOCUMENTS

| | | | | | |
|---|---|---|---|---|---|
| 3,544,148 | A * | 12/1970 | Sandor | E05B 85/14 | 292/336.3 |
| 5,127,686 | A * | 7/1992 | Gleason | E05B 5/00 | 292/216 |
| 5,794,994 | A * | 8/1998 | Miyagawa | E05B 85/13 | 292/DIG. 31 |
| 6,460,905 | B2 | 10/2002 | Süss | | |
| 6,594,861 | B2 * | 7/2003 | Dimig | E05B 85/16 | 292/336.3 |
| 7,913,361 | B2 * | 3/2011 | Tomiji | E05B 85/12 | 292/336.3 |
| 8,746,759 | B2 * | 6/2014 | Bailey | E05B 85/12 | 292/DIG. 64 |

(Continued)

FOREIGN PATENT DOCUMENTS

GB 2429039 A 2/2007

*Primary Examiner* — Kristina R Fulton
*Assistant Examiner* — Noah Horowitz
(74) *Attorney, Agent, or Firm* — Christopher G. Darrow; Darrow Mustafa PC

(57) ABSTRACT

A vehicle inside door lever assembly includes a frame, a lever rotatably mounted on the frame so as to be rotatable with respect to the frame, and a torsion spring structured and operably connected to the lever and the frame so as to rotationally bias the lever in a first rotational direction, toward a closed and latched condition of the lever. An extension spring is structured and operably connected to the lever and the frame so as to rotationally bias the lever in the first rotational direction when the spring is in tension. In a lever where a side impact force acting on the lever would tend to rotate the lever in a second rotational direction opposite the first rotational direction, the arrangement described may prevent the lever from swinging inwardly in the second rotational direction toward an unlatched condition and releasing the door latch.

8 Claims, 4 Drawing Sheets

(56) References Cited

U.S. PATENT DOCUMENTS

| | | | |
|---|---|---|---|
| 9,151,089 | B2 | 10/2015 | Aerts et al. |
| 9,399,879 | B2 * | 7/2016 | Burns ..................... E05B 85/18 |
| 10,364,593 | B2 * | 7/2019 | Alexander .............. E05B 85/20 |
| 10,815,697 | B1 * | 10/2020 | Weinerman ......... E05B 47/0012 |
| 11,306,515 | B2 * | 4/2022 | Vanden ................... E05B 77/06 |
| 11,643,855 | B2 | 5/2023 | Och et al. |
| 12,180,754 | B2 * | 12/2024 | Saijo ....................... E05B 81/56 |
| 2018/0087299 | A1 * | 3/2018 | Okuma ...................... B60J 5/04 |

* cited by examiner

VEHICLE INSIDE DOOR LEVER ASSEMBLY

TECHNICAL FIELD

The present invention relates to levers for actuating door latching mechanisms for vehicle doors and, more particularly, to a mechanism for automatically controlling the rotational motion of a door lever mounted on a vehicle side door inside the vehicle passenger compartment.

BACKGROUND

A passenger vehicle may have side doors positioned along sides of the vehicle to permit users to enter the vehicle occupant compartment from the sides. Each side door may include an inside door lever assembly operably connected to a door latching mechanism structured to maintain the door in a closed and latched condition when the door is closed. An inside door lever of the lever assembly is rotatable by a user to unlatch the door, enabling the door to be opened. When another vehicle collides with the side door, an impulse force may act on the side door lever. In some cases, the impulse force may be sufficient to generate enough momentum in the lever to cause the lever to rotate in an open/unlatch rotational direction of the lever an amount sufficient to unlatch the door, allowing the door to undesirably swing open.

SUMMARY

In one aspect of the embodiments described herein, a vehicle inside door lever assembly is provided. The assembly includes a frame, a lever rotatably mounted on the frame so as to be rotatable with respect to the frame, and a torsion spring structured and operably connected to the lever and the frame so as to rotationally bias the lever in a first rotational direction. An extension spring is structured and operably connected to the lever and the frame so as to rotationally bias the lever in the first rotational direction when the spring is in tension.

BRIEF DESCRIPTION OF THE DRAWINGS

The accompanying drawings, which are incorporated in and constitute a part of the specification, illustrate various systems, methods, and other embodiments of the disclosure. In some embodiments, one element may be designed as multiple elements or multiple elements may be designed as one element. In some embodiments, an element shown as an internal component of another element may be implemented as an external component and vice versa. Furthermore, elements may not be drawn to scale. Also, unless otherwise stated or shown, the same or similar elements shown in different views may be given the same or similar reference numerals or designations.

DETAILED DESCRIPTION

A vehicle inside door lever assembly includes a frame, a lever rotatably mounted on the frame so as to be rotatable with respect to the frame, and a torsion spring structured and operably connected to the lever and the frame so as to rotationally bias the lever in a first rotational direction, toward a closed and latched condition of the lever. An extension spring is structured and operably connected to the lever and the frame so as to rotationally bias the lever in the first rotational direction when the spring is in tension. In a collision event where a side impact force acting on the lever would tend to rotate the lever in a second rotational direction opposite the first rotational direction, the arrangement described may prevent the lever from swinging inwardly in the second rotational direction toward an unlatched condition and releasing the door latch.

The various elements set forth in the following description may be fabricated from any material or materials (e.g., metals, polymers, etc.) suitable for the purposes described herein.

Figure 1A:
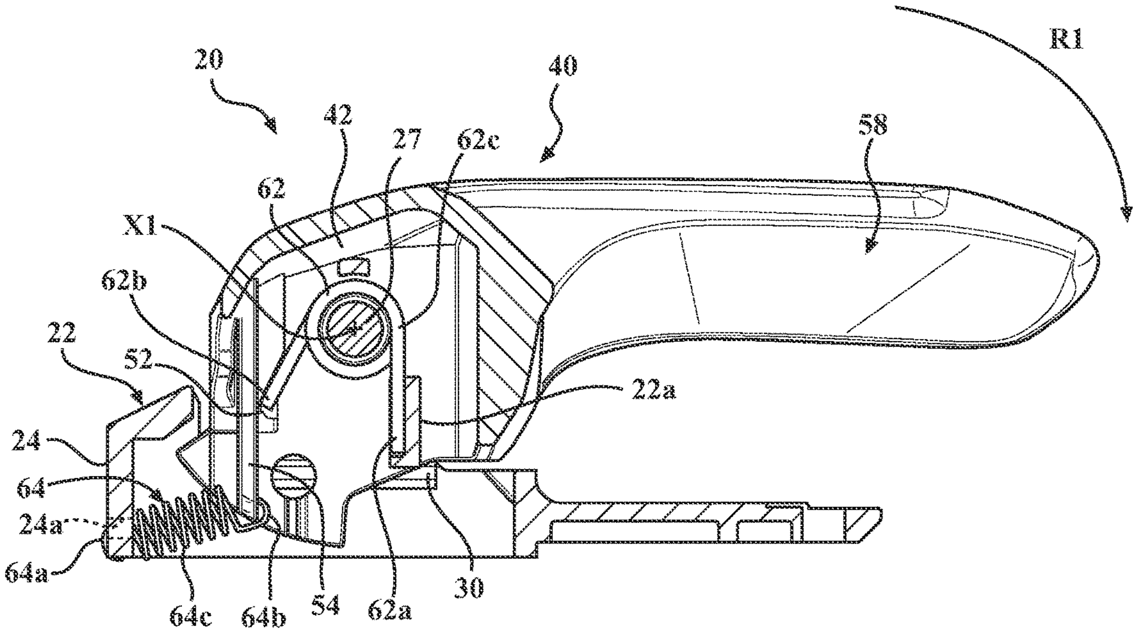
FIG. 1A is a schematic plan view of a vehicle inside door lever assembly in accordance with an embodiment described herein, shown with a lever of the assembly in a closed and latched orientation.
Figure 1B:
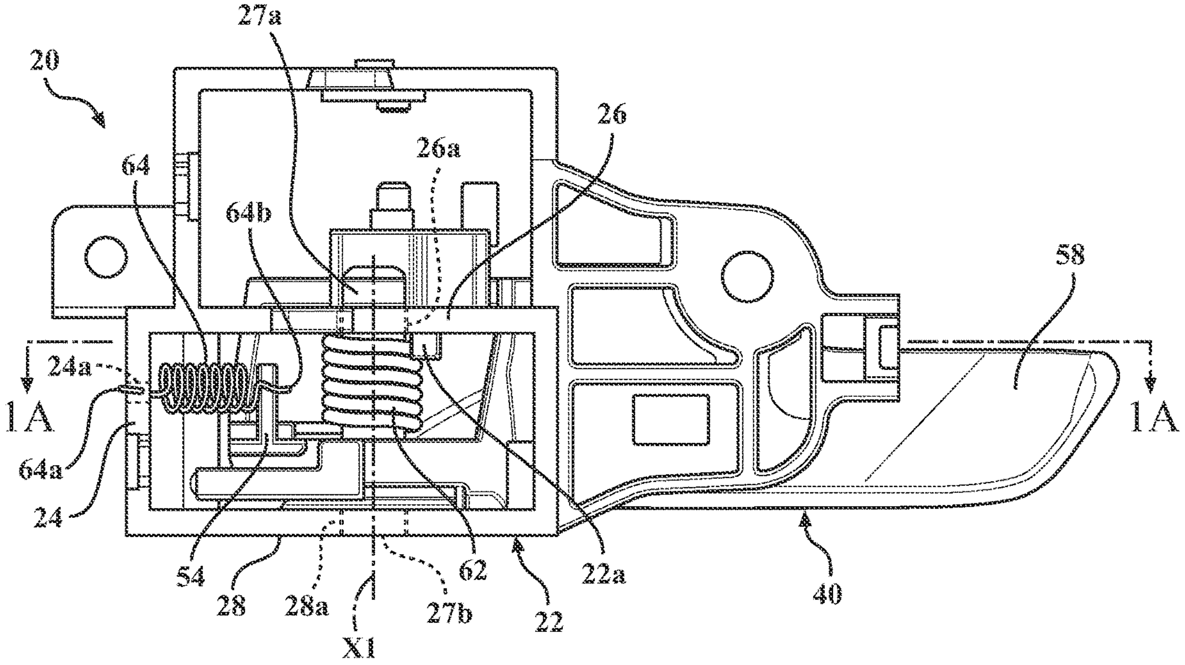
FIG. 1B is a schematic side view of the inside door lever assembly shown in FIG. 1A.
Figure 2A:
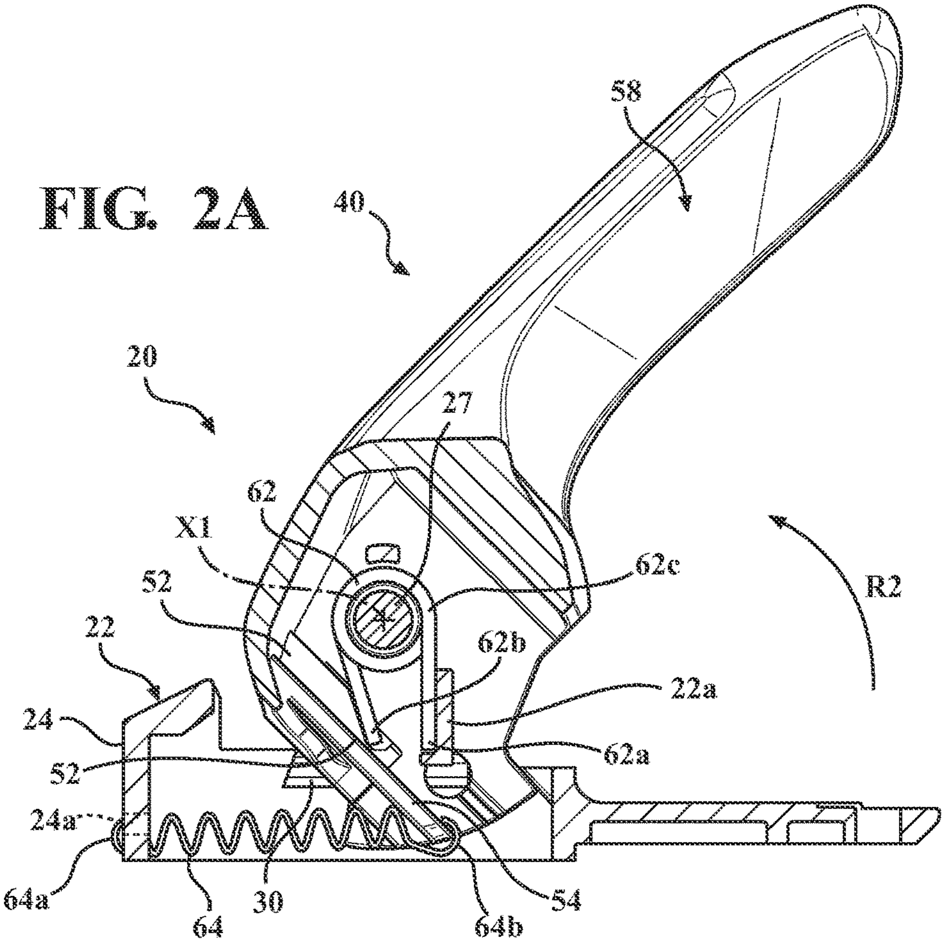
FIG. 2A is the view of the inside door lever assembly shown in FIG. 1A, with the lever shown in an open and unlatched orientation.
Figure 2B:
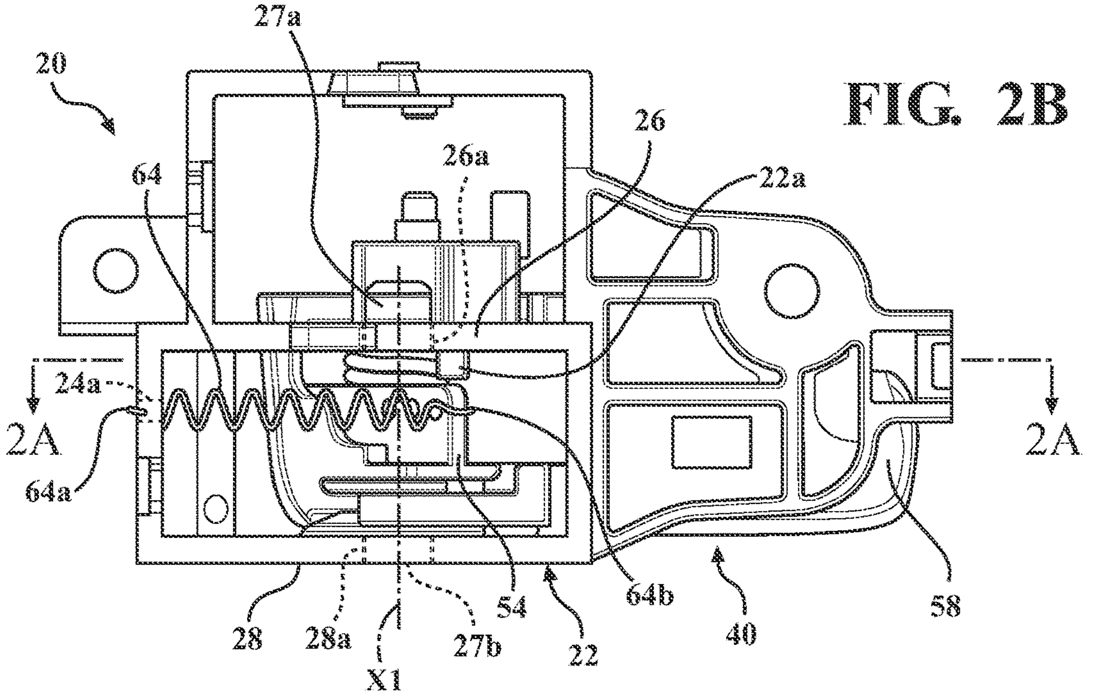
FIG. 2B is a schematic side view of the inside door lever assembly shown in FIG. 2A.

FIG. 1A is a schematic plan view of a vehicle inside door lever assembly (generally designated 20) in accordance with an embodiment described herein, shown with a lever 40 of the assembly in a closed and latched orientation. FIG. 1B is a schematic side view of the inside door lever assembly 20 shown in FIG. 1A. FIG. 2A is the view of the inside door lever assembly shown in FIG. 1A, with the lever shown in an open and unlatched orientation. FIG. 2B is a schematic side view of the inside door lever assembly 20 shown in FIG. 2A. Referring to FIGS. 1A-2B, the vehicle inside door lever assembly 20 may be structured for attachment to a portion of a vehicle side door (not shown) facing toward an interior of the vehicle. The inside door lever assembly 20 may be operable to maintain the vehicle side door in a closed and latched condition when the door is fully closed and the lever is in the orientation shown in FIGS. 1A-1B. The inside door lever assembly 20 may be operable by a user to unlatch the door, to enable the door to be opened. More specifically, the door lever may be unlatched by rotating the lever in rotational direction R2 shown in FIG. 2A.

In arrangements described herein, the inside door lever assembly 20 may include a frame 22. The frame 22 may be attachable to a body of the vehicle door. The frame 22 may provide a structure to which the lever 40 and other elements of the lever assembly 20 may be mounted. The frame 22 may include a torsion spring first bearing surface 22*a*. The torsion spring first bearing surface 22*a* may anchor a first end 62*a* of a torsion spring 62 to prevent movement of the spring first end 62*a* during deformation of the spring resulting from rotation of the lever 40 as described herein.

The frame 22 may include an extension spring frame connection structure including one or more extension spring frame connection feature(s) configured to enable attachment of a first end of an extension spring thereto. In one or more arrangements, as shown in the drawings, the extension spring frame connection structure may include a wall 24 and at least one opening or hole 24*a* formed in the wall as frame extension spring connection feature(s) to enable a first end 64*a* of a coil-type extension spring 64 to be inserted therethrough.

Referring to FIGS. 1B and 2B, the frame 22 may also include a first wall 26 having a first opening 26*a* structured to receive a first end 27*a* of a shaft therein. A second wall 28 may be positioned opposite the first wall 26 and may include a second opening 28*a* structured to be coaxial or otherwise in alignment with the first opening 26*a*. The second opening 28*a* may be structured to receive a second end 27*b* of the shaft 27 therein. Shaft 27 may extend between first and second walls 26, 28 and may support the lever 40 and torsion spring 62 for rotation with respect to the frame 22. Referring to FIG. 1A, the frame 22 may also include a hard stop 30 structured to contact the lever 40 to prevent further rotation of the lever in a first rotational direction R1 when the lever 40 is in the closed/latched orientation.

Referring to the drawings, embodiments of the inside door lever assembly 20 may also include a lever 40 operably connected to a vehicle door latching mechanism (not shown) including a door latch. The lever 40 may be rotatably mounted on the frame 22 (i.e., the lever 40 may be mounted on the frame so as to be rotatable with respect to the frame). The lever 40 may be rotatable in first rotational direction R1 to a closed orientation engaging the door latch to maintain the vehicle door in a closed and latched condition when the door is fully closed. The lever 40 may also be rotatable in second rotational direction R2 (FIG. 2A) to an open or unlatched orientation to enable the lever to be disengaged from the door latch. The term "operably connected," as used throughout this description, can include direct or indirect connections, including connections without direct physical contact.

Figure 3:
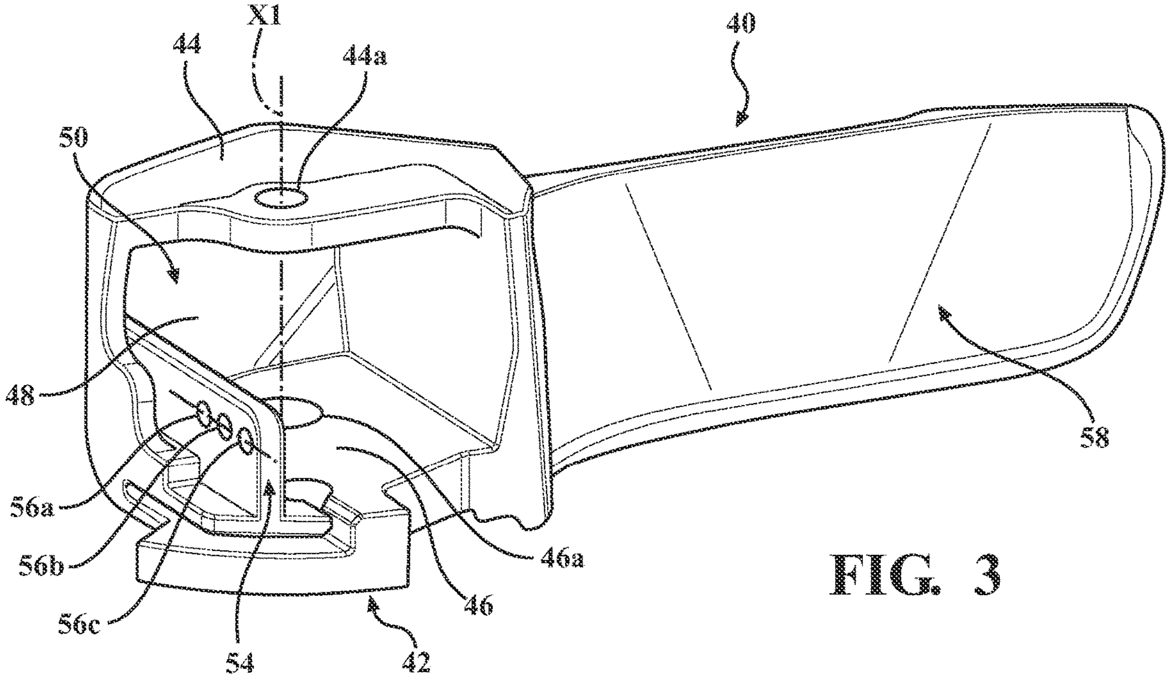
FIG. 3 is a schematic perspective view of an embodiment of a lever of the inside door lever assembly, showing part of an interior of the lever base portion.

The lever 40 may have a base portion 42 structured for rotational mounting to the frame 22. Referring in particular to FIG. 3, the base portion 42 may have a pair of opposed walls 44, 46. A first base portion wall 44 may have a first hole 44*a* extending therethrough, and a second base portion wall 46 may have a second hole 46*a* extending therethrough coaxially with the first hole 44*a*. Central axis of the first and second holes 44*a*, 46*a* may define an axis of rotation X1 of lever 40 when the shaft 27 extends through the holes 44*a*, 46*a* and also through the frame openings 26*a* and 28*a*.

A connecting wall 48 may extend between and connect the first and second base portion walls 44 and 46. First wall 44, second wall 46, and connecting wall 48 may combine to define a base portion cavity 50 through which shaft 27 extends. The lever 40 may also include a torsion spring second bearing surface 52 against which a second end 62*b* of the torsion spring 62 rests during rotation of the lever 40.

The lever 40 may also include an extension spring lever connection portion including one or more extension spring connection feature(s) where a portion of the extension spring may be attached to the lever 40. In one or more arrangements, the extension spring lever connection portion may comprise a wall 54 including a plurality of spring-receiving openings or holes 56 (e.g., shown in one example as openings 56*a*, 56*b* and 56*c* in FIGS. 3 and 4) formed therealong as extension spring lever connection features for insertion of a second end 64*b* of the extension spring 64 therein, to attach the extension spring second end to the lever. Extension spring connection features other than openings (e.g., hooks extending from the wall 54) may also be used.

In particular arrangements, the wall 54 is a straight or flat wall. In certain arrangements, the spring-receiving openings 56 are evenly spaced-apart. In other arrangements, the spring-receiving openings 56 are unevenly spaced-apart. In certain arrangements, the spring receiving openings are circular holes having respective central axes which are all parallel and coplanar along a plane X2 extending through the central axes.

The extension spring 64 may include a first end 64*a*, a second end 64*b*, and a body 64*c* extending between and supporting the first and second ends. The extension spring 64 may be structured to be stretchable or deflectable in tension to exert a force in a direction opposite the spring stretching direction. The extension spring 64 may be structured and operably connected to the lever 40 and to the frame 22 so as to rotationally bias the lever 40 in the first rotational direction R1 when the extension spring is in tension. In one or more arrangements, the extension spring 64 may be a coil spring stretchable in tension to provide a restoring force and structured to have a linear force-deflection plot over the range of extensions to be expected during use. However, any type of spring suitable for the purposes described herein may be used.

The torsion spring 62 may have a first end 62*a*, a second end 62*b*, and a body 62*c* extending between and supporting the first and second ends. The body 62*c* may be structured to be wrappable around the shaft 27 and to be coaxial with the shaft when wrapped around the shaft 27. The torsion spring 62 may be structured and operably connected to the lever 40 and to the frame 22 so as to rotationally bias the lever 40 in the first rotational direction R1. In one or more arrangements, the torsion spring 62 may be a conventional helical torsion spring that works by twisting one or both ends along a central/coil axis. When it is twisted, the spring 62 exerts a torque in a direction opposite the twist direction and proportional to the amount it is twisted. However, any type of spring suitable for the purposes described herein may be used.

Referring to FIGS. 1A-3, the extension spring second end 64*b* may be attached to the lever 40 at any of the spring-receiving openings 56. Varying the extension spring second end attachment location among the various extension spring lever connection features will also vary the moment exerted by the extension spring 64 due to the extension spring force. For example, referring to FIG. 4, if the extension spring second end 64*b* is attached to the lever 40 at a first lever connection opening 56*a* such that the extension spring 64 extends along a line S1, the extension spring 64 may be stretched a first amount between the connection features 24*a*, 56*a* when the lever 40 is in its closed/latched orientation, thereby generating a first restoring force acting on the lever 40. The moment arm of the first restoring force (i.e., a shortest perpendicular distance from the rotational axis X1 to a line of action of the first restoring force) may be MA1. However, if the extension spring second end 64*b* is attached to the lever 40 at a second lever connection feature 56*b* such that the extension spring 64 extends along a line S2, the extension spring 64 may be stretched a second amount greater than the first amount, thereby generating a second restoring force greater than the first restoring force. In addition, the moment arm MA2 of the second restoring force may be greater than the moment arm MA1 of the first restoring force.

Increasing both the extension spring force and the moment arm of the force may increase the effective moment exerted by the extension spring 64. In this manner, the moment exerted by the extension spring 64 can be constructively varied (for a given single spring design) by attaching the extension spring second end 64*b* to different lever connection features 56.

Aspects such as the locations of the extension spring lever connection features 56 with respect to the location of the extension spring frame connection feature 24*a* (which may determine the initial line of action of the extension spring force and the amount the extension spring is stretched), the spring parameters (e.g., force-deflection curve, etc.), and other pertinent parameters may be optimized analytically and/or iteratively through testing and experimentation to provide a range of useful extension spring moment values, any of which may be selected by shifting attachment of the extension spring second end 64*b* between alternative ones of extension spring lever connection features 56 while maintaining attachment of the extension spring first end 64*a* at a single location (i.e., opening 24*a*).

Figure 5:
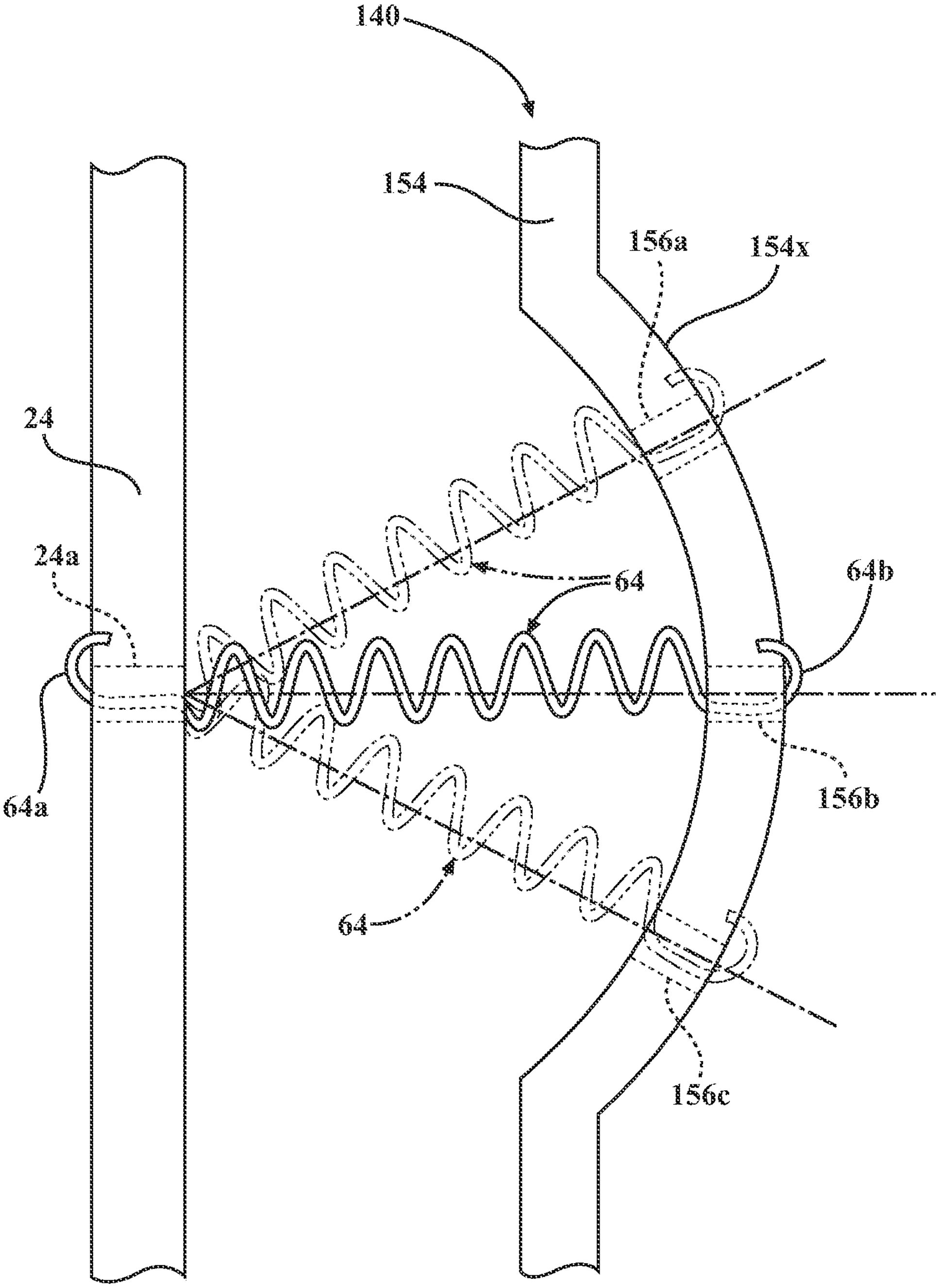
FIG. 5 is a magnified plan view of a portion of a lever in accordance with an alternative embodiment described herein.

FIG. 5 is a magnified plan view of a portion of an alternative embodiment 140 of the lever having a wall 154 with an arcuate portion 154*x*. Referring to FIG. 5, in particular arrangements, the wall 154 forming the extension spring lever connection portion may include an arcuate portion 154*x*. Arcuate portion 154*x* may have a plurality of spring-receiving openings 156*a*, 156*b*, 156*c* (similar to openings 56 of wall 54 in FIG. 3) structured as extension spring lever connection features for receiving the second end 64*b* of extension spring 64 therein. In particular arrangements, the spring-receiving openings 156*a*, 156*b*, 156*c* are equi-angularly spaced apart along the arcuate portion 154*x*. In particular arrangements, the spring-receiving openings 156*a*, 156*b*, 156*c* have associated central axes which are coplanar.

In addition, the arcuate portion 154*x* may be structured and positioned with respect to an extension spring frame connection feature 24*a* so that each of the spring-receiving openings 156*a*, 156*b*, 156*c* is equidistant (within applicable tolerance limits) from the extension spring frame connection feature 24*a* when the lever 140 is in the closed/latched orientation. In this arrangement, when the extension spring first end 64*a* is connected to the extension spring frame connection feature 24*a* and the extension spring second end 64*b* is connected to any one of the spring-receiving openings 156*a*, 156*b*, 156*c*, the extension spring 64 stretches the same amount (within applicable tolerance limits) no matter which of the spring-receiving openings 156*a*, 156*b*, 156*c* the spring second end 64*b* is attached to, when the lever in the closed and latched orientation. This arrangement may enable the moment due to the extension spring force to be varied while minimizing variability in the restoring force applied to the lever due to the stretching of the extension spring. Thus, changes in the force moment produced by the extension spring 64 may be due primarily to variations in the moment arms as the extension spring second end attachment locations are varied. An ability to vary moments by adjusting the moment arm alone may enable smaller gradations of torque adjustment to meet particular operational requirements.

Figure 4:
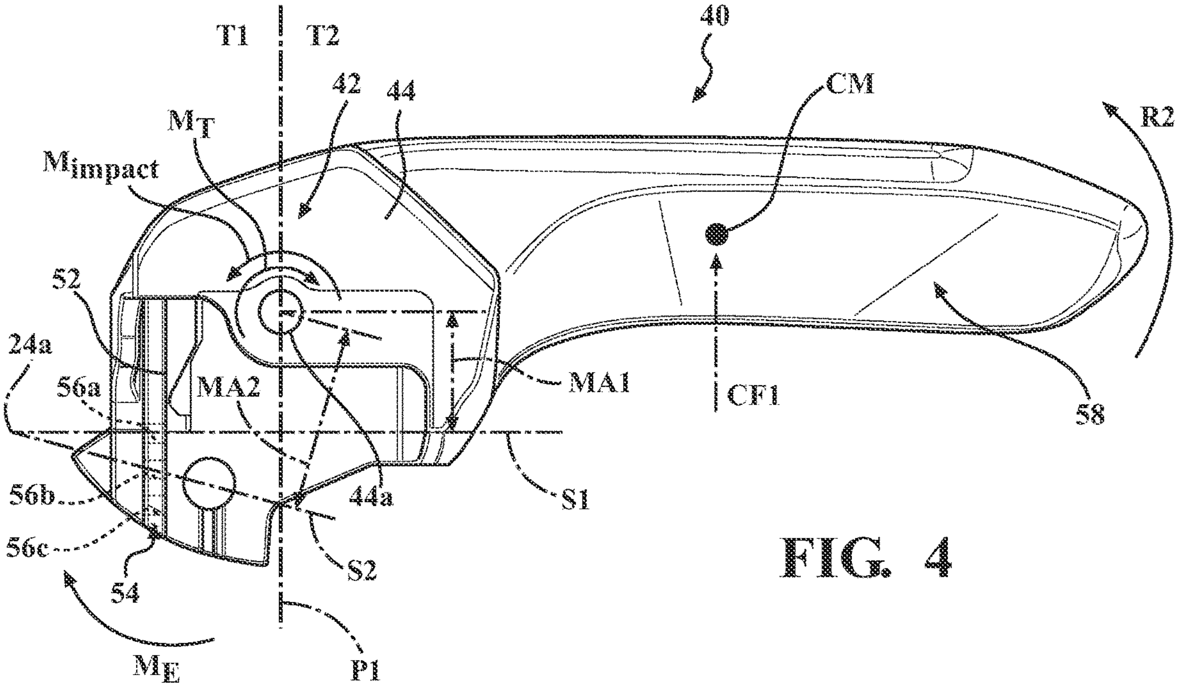
FIG. 4 is a schematic plan view of the lever embodiment shown in FIG. 3.

Referring again to FIG. 4, embodiments of the lever 40 may also include a longitudinal gripping portion 58 extending from the base portion 42. The gripping portion 58 may be structured to enable a user to grip the lever 40 so as to enable rotation of the lever about the lever rotation axis X1 to unlatch the vehicle door. Referring to FIGS. 1A and 4, lever 40 may be structured so that when it is mounted in a vehicle and operably connected to a door latching mechanism, a center of mass CM of the lever 40 may be located along (i.e., within the structure of) the gripping portion 58, and with respect to the lever rotational axis X1 such that an impact force CF1 acting on the vehicle door in the direction shown will operate on the center of mass CM so as to cause the lever to rotate about axis X1 in a second rotational direction R2. Because torsion spring 62 and extension spring 64 are connected to the lever 40 and to the frame 22 so as to rotationally bias the lever 40 in the first rotational direction R1, the torsion spring 62 and extension spring 64 may operate to resist rotation of the lever in the second rotational direction R2.

Referring to FIG. 4, in particular arrangements, when the inside door lever assembly 20 is mounted in a vehicle side door for operation by a user, the rotational axis X1 is vertical or substantially vertical and a plane P1 is a plane structured so as to extend along the axis X1 and perpendicular or substantially perpendicular to a fore-aft axis of the vehicle in which the inside door lever assembly is mounted. In such an arrangement, the inside door lever assembly 20 may be structured so that the extension spring frame connection feature 24*a* is positioned along a first side T1 of the plane P1, and the center of mass CM of the lever 40 is located along a second side T2 of the plane P1 opposite the first side T1.

When a vehicle collides with a side door of a vehicle incorporating an embodiment of the vehicle inside door lever assembly, an impulse force CF1 may act on the side door lever 40. In some cases, the impulse force CF1 may be sufficient to generate enough momentum in the lever 40 (effectively acting on the center of mass CM of the lever 40) that the lever rotates in an open/unlatch rotational direction R2 of the lever an amount sufficient to unlatch the door. In one or more arrangements described herein, characteristics of the torsion spring 62, the extension spring 64, and the features of the structures to which these springs are connected are specified so that the sum of the moments acting on the lever 40 due to the torque and extension spring forces will counteract a moment caused by a collision impulse force of up to a predetermined magnitude acting on the lever at the center of mass CM (i.e., $M_T+M_E>=M_{impact}$, where $M_T$=moment due to the torsion spring force, $M_E$=the moment due to the extension spring restoring force, and $M_{impact}$=the moment caused by the impulse force). This arrangement may prevent the lever from swinging inwardly in second rotational direction R2 and releasing the door latch.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle inside door lever assembly comprising:

a frame;

a lever rotatably mounted on the frame;

a torsion spring structured and operably connected to the lever and the frame so as to rotationally bias the lever in a first rotational direction when the lever is not in physical contact with a user; and an extension spring structured and operably connected to the lever and the frame so as to rotationally bias the lever in the first rotational direction when the extension spring is in tension.

2. The inside door lever assembly of claim 1, wherein the lever comprises a base portion and a gripping portion extending from the base portion, and wherein a center of mass of the lever is located along the gripping portion.

3. The inside door lever assembly of claim 1, wherein the lever comprises an extension spring lever connection portion including a plurality of holes formed therealong, each hole being structured to receive an end of an extension spring therein.

4. The inside door lever assembly of claim 3, wherein the extension spring lever connection portion is flat and the spring-receiving holes have central axes which are coplanar.

5. The inside door lever assembly of claim 3, wherein the extension spring lever connection portion is arcuate, and the spring-receiving holes are equi-angularly spaced apart along the arcuate portion.

6. The inside door lever assembly of claim 3, wherein the frame includes an extension spring frame connection feature, and wherein the extension spring lever connection portion is arcuate and the spring-receiving openings are positioned equidistant from the extension spring frame connection feature.

7. The inside door lever assembly of claim 1, wherein the frame includes an extension spring frame connection feature positioned along a first side of a plane extending along a rotational axis of the lever, and wherein a center of mass of the lever is located along a second side of the plane opposite the first side.

8. A vehicle inside door lever assembly comprising:

a frame;

a lever rotatably mounted on the frame, the lever having an arcuate extension spring lever connection portion including a plurality of holes distributed along the arcuate portion so as to be spaced equidistantly from an extension spring frame connection feature formed on the frame.

* * * * *